United States Patent [19]

Mastro

[11] Patent Number: 5,285,312
[45] Date of Patent: Feb. 8, 1994

[54] IMAGE-REFLECTING MEANS, AND IN COMBINATION WITH AN ARTICLE OF APPAREL

[76] Inventor: J. Albert Mastro, 44 W. Valley Brook Rd., Long Valley, N.J. 07853

[21] Appl. No.: 4,309

[22] Filed: Jan. 14, 1993

[51] Int. Cl.$^5$ .............................................. G02B 5/12
[52] U.S. Cl. ................................... 359/516; 359/519; 359/879; 2/144; 2/247
[58] Field of Search ............... 359/516, 517, 518, 519, 359/515, 879, 880; 2/144, 145, 146, 147

[56] References Cited

U.S. PATENT DOCUMENTS

| | | | |
|---|---|---|---|
| 1,607,985 | 11/1926 | Johnson | 359/789 |
| 1,823,814 | 9/1931 | Aiello | 359/789 |
| 3,527,518 | 9/1970 | Tomlinson et al. | 359/518 |
| 3,624,686 | 11/1971 | Beals | 2/247 |
| 3,849,804 | 11/1974 | Rakow | 359/518 |
| 4,365,354 | 12/1982 | Sullivan | 359/519 |
| 4,418,733 | 12/1983 | Kallman | 359/516 |
| 4,443,056 | 4/1984 | Sullivan | 359/516 |
| 4,636,047 | 1/1987 | Green | 359/789 |
| 4,863,239 | 9/1989 | Malone | 359/789 |

Primary Examiner—Loha Ben
Attorney, Agent, or Firm—Bernard J. Murphy

[57] ABSTRACT

Flexible film of plastic material, such as "Mylar", and coated with metal to provide a mirror surface, can be sewn onto a normally obscured portion of apparel, such as a necktie, to provide a discreet mirror. Alternatively, the mirror-film can be cemented in place, or can have "Velcro" hooks or loops adhered thereto for engagement with the complementary hooks or loops of a sheet thereof borne on an under-portion of clothing, i.e., a sweater, or the like, or the inner flap of a pocketbook, under a sun visor, or an inner fold surface of a wallet.

8 Claims, 1 Drawing Sheet

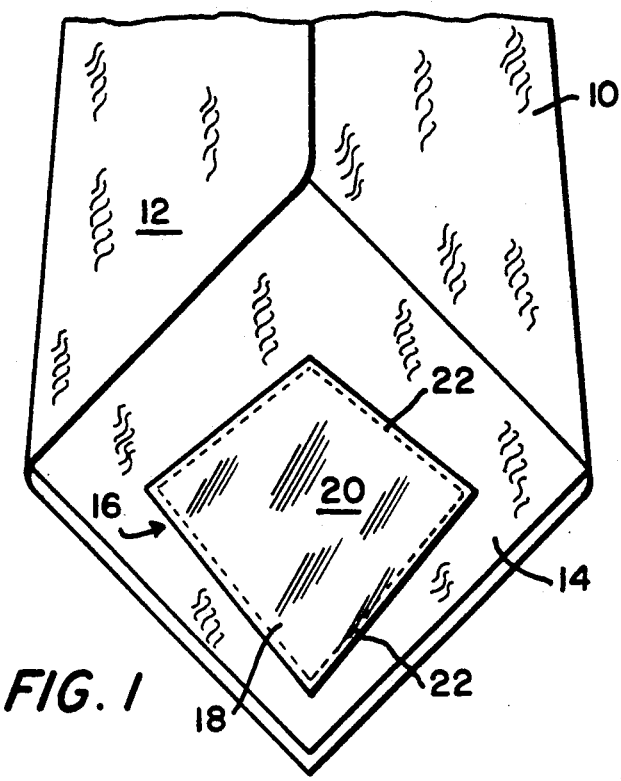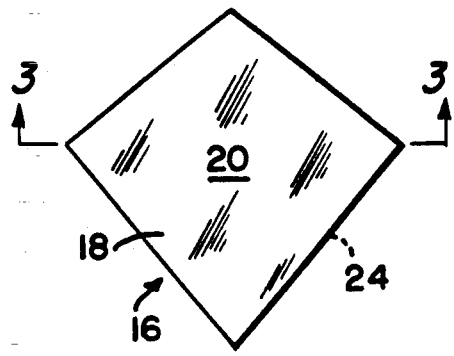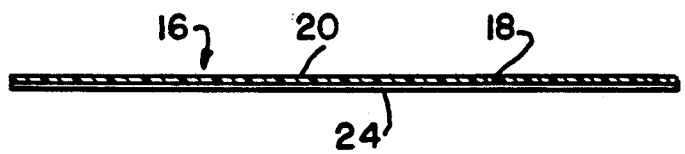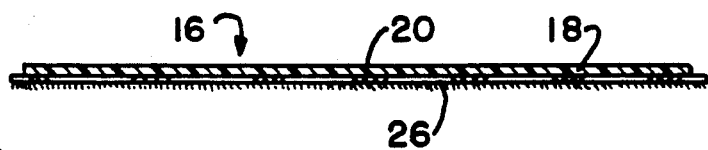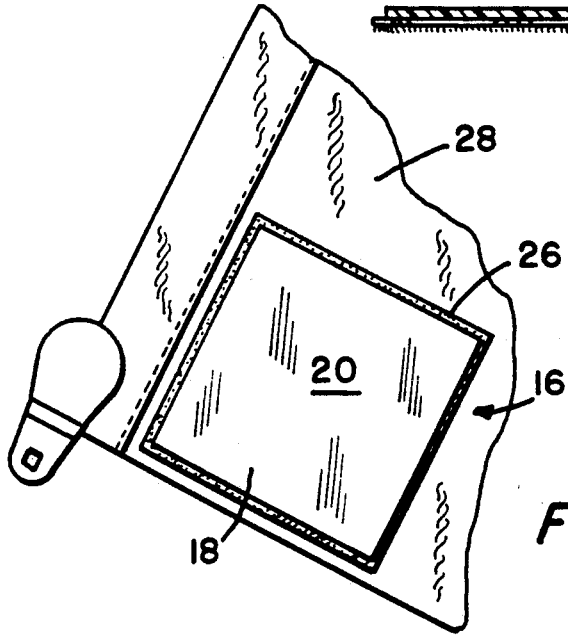

IMAGE-REFLECTING MEANS, AND IN COMBINATION WITH AN ARTICLE OF APPAREL

This invention pertains to an image-reflecting means, i.e., a means with a mirror-like surface which is flexible and is facilely attachable to any number of articles, and such means in combination with an article of apparel.

It is well known for women to carry a compact which has a mirror borne on the inner surface of the hinged cover of the compact, the same being used in order that one can survey one's appearance. Such is reasonably convenient for women, except that it does require women to carry the compact in a pocketbook, open the latter, extract the compact, and raise the cover.

For men, and also to facilitate a more convenient means for women as well, there obtains a need for an image-reflecting means, i.e., some means having a mirror-like surface, which is readily attachable to articles, namely articles of clothing, the underside flap of a pocketbook, the reverse side of an automobile sun visor, and the like.

It is an object of this invention, then, to meet the aforesaid need.

Particularly, it is an object of this invention to set forth an image-reflecting means, for attachment thereof to a normally unexposed surface of an article, comprising a flexible film of material having (a) a reflecting surface, and (b) an opposite, attaching surface; and means on the opposite, attaching surface for causing the opposite surface to adhere, removably, to an unexposed surface of an article.

It is further an object of this invention to set forth, in combination, an article of apparel with image-reflecting means, comprising an article of clothing; wherein the article has (a) a first, frontal, normally-exposed surface, and (b) a second, rear, normally-unexposed surface; and means, joined to the second surface, for reflecting images thereon.

Further objects of this invention, as well as the novel features thereof, will become apparent by reference to the following description, taken in conjunction with the accompanying figures, in which:

FIG. 1 is a plan view of the normally-unexposed, reverse side of a necktie, the same having an image-reflecting means fixed thereto;

FIG. 2 is a plan view of the image-reflecting means of FIG. 1;

FIG. 3 is a cross-sectional view of the means of FIG. 2, the same taken along section 3—3 of FIG. 2, and FIG. 3 being of twice the scale of FIG. 2;

FIG. 4 is a view, like that of FIG. 3, depicting an alternative attachment means; and FIG. 5 is a plan view of the reverse, normally-unexposed side of a zippered sweater, the same also having an image-reflecting means fixed thereto.

As shown in FIG. 1, a necktie 10 has a reverse, normally-unexposed side 12, with lining 14 therein. An arbitrarily configured embodiment 16 of the invention is fixed to the lining 14. Embodiment 16 of the invention comprises an image -reflecting means 18. Means 18 comprises a flexible film of plastic material, the same, in this embodiment, being the plastic film sold under the trademark "Mylar", and coated with metal to provide a mirror surface 20. Embodiment 16 is sewn to the lining 14 by means of threaded stitches 22.

It will be appreciated that the wearer of the necktie 10 can, most discreetly, turn up the side 12 of the tie to present the embodiment 16 to view, in order that the wearer can survey his or her visual appearance. The embodiment 16 is flexible, so that it is not subject to fracture. Too, unlike glass mirrors, it is of light weight; for not being of rigid construction, the embodiment 16 can not tear associated clothing or scratch the wearer.

In FIG. 2, the embodiment 16 has an alternative means of attachment. In lieu of sewing the same to an article, it can employ an adhesive 24, as indicated in FIG. 3, which, by way of example, can be rubber cement. Too, the adhesive 24 could be double-faced, adhesive tape.

In FIG. 4, yet another means of attachment is depicted. Here, a sheet 26 of fiber hooks or fiber loops, sold under the trademark "Velcro", is cemented to the embodiment 16. If fiber hooks are borne on the sheet 26 then, clearly, the article to which the inventive embodiment 16 is affixed shall require a sheet of fiber loops, and vice versa.

FIG. 5 shows a portion of the reverse, normally-unexposed side of a zippered sweater 28. The sweater material would have the appropriate hooks or loops fixed thereto, by sewing a sheet thereof in place, and the sheet 26 of embodiment 16 will be held, securely, as shown, upon being engaged with the sweater-carried sheet of gripping hooks or loops.

While I have described my invention in connection with specific embodiments thereof, it is to be clearly understood that this is done only by way of example, and not as a limitation to the scope of the invention, as set forth in the objects thereof, and in the appended claims. Besides neckties, sweaters, and other such articles of apparel, the novel embodiment 16 can, pursuant to my teaching in the foregoing, be affixed to the inner flap of a pocketbook, the under side of an automobile visor, to an inner fold surface of a wallet, and such. Consequently, all alternative practices of the invention are deemed to be within the ambit of my disclosure herein, and embraced by the following claims.

I claim:

1. In combination, an article of apparel with image-reflecting means, comprising:
   an article of clothing; wherein
   said article has (a) a first, frontal, normally-exposed surface, and (b) a second, rear, normally-unexposed surface; and
   means, joined to said second surface, for reflecting images thereon.

2. The combination of claim 1, wherein:
   said article comprises a necktie; and
   said images-reflecting means comprises a flexible mirror.

3. The combination of claim 1, wherein:
   said images-reflecting means comprises a film of plastic.

4. The combination of claim 3, wherein:
   said film of plastic has (a) a reflecting surface, and (b) an opposite, attaching surface; and further including
   means on said opposite, attaching surface for causing said opposite surface to adhere, removably, to said normally-unexposed surface of said article of clothing.

5. The combination of claim 4, wherein:
   said means on said opposite surface comprises an adhesive.

6. The combination of claim 4, wherein:
said means on said opposite surface comprises a sheet of fiber hooks cemented thereon.
7. The combination of claim 4, wherein:
said means on said opposite surface comprises a sheet of fiber loops cemented thereon.
8. In combination, an article of apparel with image-reflecting means, comprising:
an article of clothing; and
a flexible film of material having (a) a reflecting surface, and (b) an opposite, attaching surface; wherein
said article has (a) a first, frontal, normally-exposed surface, and (b) a second, rear, normally-unexposed surface; and
said film of material is sewn to said article of clothing with said attaching surface confronting said second surface.

* * * * *